May 19, 1931.                 C. H. WHITE                 1,805,506
                WIRE DOFFING MECHANISM FOR PLANTERS
                         Filed Sept. 6, 1927
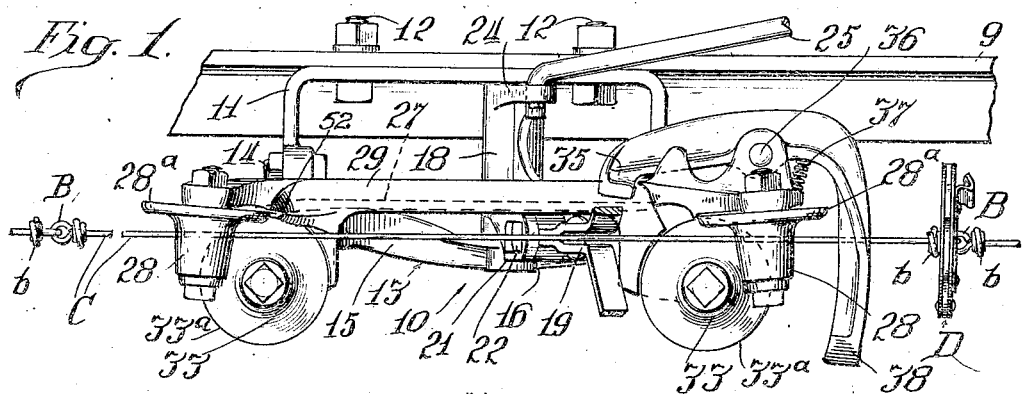
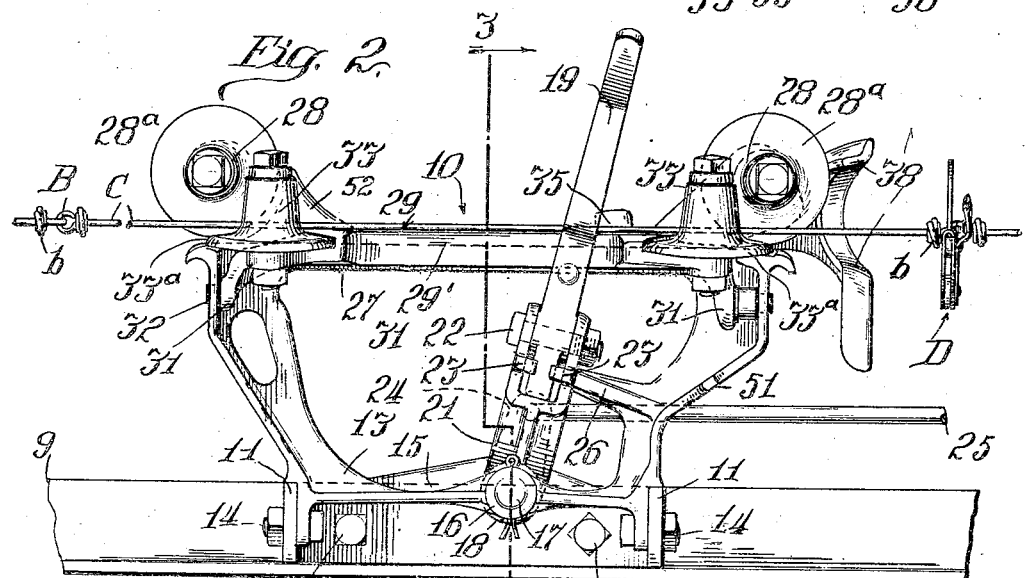
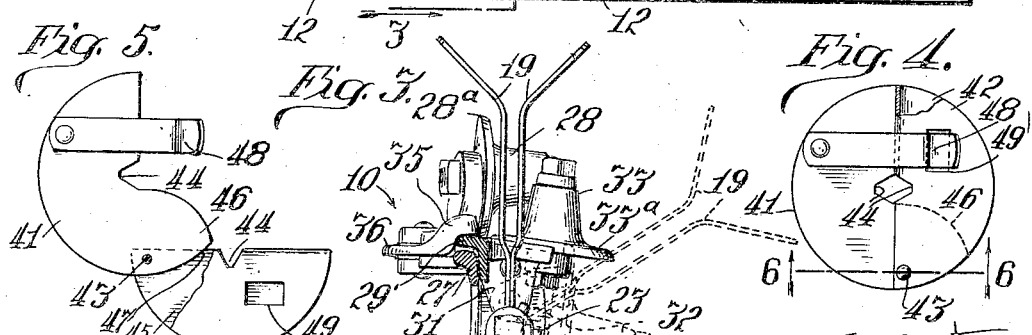
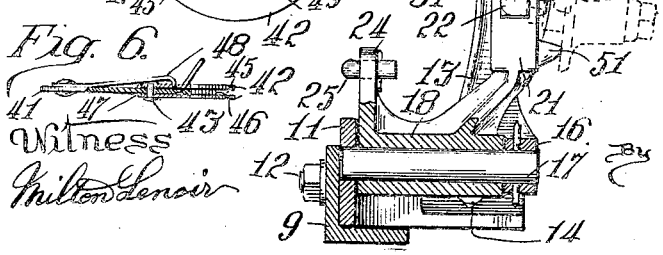
Inventor
Charles H. White
John L. Jackson
Attorney
Witness
Milton Lenoir Patented May 19, 1931

1,805,506

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

WIRE DOFFING MECHANISM FOR PLANTERS

Application filed September 6, 1927. Serial No. 217,569.

The present invention relates to planting implements designed for check row planting and has particular reference to mechanism for doffing the check-wire from the planter at the ends of the rows.

Heretofore, the operation of doffing the check-wire has been performed either as a direct manual operation, effected through a foot pedal or the like, or as a secondary part of the operation of lifting the planter runners at the ends of the rows, effected for example through linkage connecting the lifting lever with the check heads. In either case, it will be evident that the operation of doffing the wire requires some act on the part of the operator, and hence there is no assurance that the wire will always be doffed at the same point at the ends of the rows i. e. along the same transverse line at each end of the field. It therefore follows that according to these prior methods of doffing, the planting operation is frequently continued too far or not far enough to secure uniformity of planting or cross checking at the ends of the field; and furthermore, that in many instances the planter is allowed to run up so close to the anchor stake before doffing that the wire is placed under an objectionable tension, such being caused by the relatively sharp angle which must then be assumed by that portion of the wire extending between the anchor stake and the planter. The tension exerted on the wire by driving up too close to the anchor stake will frequently tip the other anchor stake at the opposite end of the field, or will pull such stake completely out of the ground.

The principal object of the present invention is to overcome these objections by providing a different method of doffing, wherein the check-wire is doffed entirely automatically when the planter comes up to a certain fixed point on the wire, corresponding to the end of the row. More particularly, this is accomplished by mounting on the check-wire, at each end of the row, a relatively large projection or doffing button, which is utilized to trip the check-head for opening the same when the planter reaches said button.

One of the particular objects of the invention, for accomplishing the foregoing, is to provide an improved construction of check-head which can be tripped open in this manner by a doffing projection on the wire.

Another object of the invention is to provide a novel construction of doffing button which can be attached to and detached from the check-wire in a simple, easy operation; and to provide such a button which can effect interlocking engagement with one of the ordinary check-row buttons on the wire, so that the doffing button will not shift along the wire.

The above described doffing mechanism is of particular advantage for tractor propelled planters since, by relieving the operator of the necessity of calculating when the end of the row has been reached and of doffing the wire at such point, it enables him to devote all of his attention to the steering of the tractor and to the performance of other operations. Moreover the location of the doffer button on the wire forms a gage point for indicating where the next row or set of rows should be started in the opposite travel of the implement. It will be understood, of course, that these advantages are also obtained in the adaptation of my invention to horse-drawn planting implements.

Referring to the accompanying drawings illustrating a preferred form of my invention:

Fig. 1 is a plan view of the check-head, showing the doffing button mounted on the check-wire.

Fig. 2 is a side elevational view of the same.

Fig. 3 is a transverse sectional view through the check-head, taken on the plane of the line 3—3 of Fig. 2.

Fig. 4 is an elevational view of the doffing button, showing the latter closed.

Fig. 5 is a similar view showing the button open, and

Fig. 6 is a sectional view through the button, taken on the plane of the line 6—6 of Fig. 4.

Inasmuch as the aforementioned type of planting implement is old and well known I have not deemed it necessary to illustrate the same. For the purposes of the present description, it will suffice to say that the frame bar 9 represents a side portion of the implement. Mounted on this frame bar is the check-head 10. It will be understood that mounted on a corresponding frame bar at the other side of the implement is a companion check-head which is a mate to the check-head shown, these two check-heads being used alternately in the travel of the implement in opposite directions across the field. Both check-heads have the usual operating connection with the seed dropping valve mechanism, also well known.

Each check-head is mounted on a U-shaped bracket or bar 11 which is bolted at 12 to the implement frame member 9. The head comprises a stationary frame 13 which is suitably secured, as by bolts 14, to the bracket 11. A lower cross web 15, constituting part of the stationary frame, is formed with a bearing boss 16 in which is pinned one end of a transverse bearing pin 17. The other end of the bearing pin is mounted in an aligned hole in the bracket 11. Pivotally mounted on such bearing pin 17 is a check fork, comprising a lower bearing sleeve 18 and an upper fork member 19. The rotatable mounting of the bearing sleeve 18 on the pin 17 provides for the fore-and-aft swinging movement of the check fork. Extending upwardly from the bearing sleeve is a bifurcated member 21, between the arms of which passes a pivot bolt 22. The fork 19 is pivotally mounted on the bolt 22 for swinging movement transversely of the implement. The lower portion of the fork 19, below the pivot axis 22, is adapted to engage with stop lugs 23 on the member 21, for limiting the outward and downward swinging movement of the fork in doffing the wire, as will be presently described. The fore-and-aft swinging of the fork is transmitted to the seed dropping valve mechanism through an arm 24 and link 25. A stop 26 limits such movement of the fork in a forward direction. The motion transmitting linkage which connects the check fork with the seed dropping valve mechanism usually comprises spring means which normally tends to hold the fork against the stop 26.

The upwardly extending, divergent arms of the stationary frame 13 are cross connected by an upper web or bar 27. Pivotally mounted on upper extensions of such arms are guide spools or rollers 28 having a flange 28a which have their axes disposed substantially horizontal. The check-wire C passes under such spools in traveling through the check-head. The check-head also comprises a movable frame 29 which is pivotally supported on the stationary frame 13 for outward swinging movement. Such swinging frame consists of a bar 29' having downwardly curved ends 31 which are pivoted at 32 to the upwardly extending arms of the stationary frame. Two guide spools or rollers 33 having a flange 33a are pivotally supported on the swinging frame on substantially vertical axes disposed just inside of the end rollers 28. When the check-head is closed the two pairs of spools guide the check-wire into the front end of the check-head, through the check fork 19, and out of the rear end of the check-head, as the implement travels along the wire.

The check-wire shown at C is representative of the typical form of check-wire which is now most commonly used. The check row buttons B are produced by forming interengaging eyes or loops in the adjoining ends of the wire sections, and also by forming shoulders or projections b at the inner ends of such loops as by coiling the ends of the wire sections several times upon themselves. These check row planting buttons B can readily pass between the guide rollers or spools 28—33 but are of larger size than the lower end of the slot in the check fork 19. Hence as each button strikes such fork it causes the fork to swing rearwardly for actuating the seed dropping valve mechanism. The buttons clear themselves from the fork by slipping through the widened upper end of the fork.

The main bar 29' of the swinging frame is of angle cross section (Fig. 3), and when the check-head is closed this bar embraces the upper and outer sides of the stationary web or bar 27. The check-head is normally held closed by a latch 35 which is pivotally supported on the stationary frame 13 on a lug 36 extending therefrom. The nose or operative end of the latch is normally held in latching engagement over the swinging frame bar 29' (Fig. 3) by a compression spring 37 confined between the latch and the stationary frame. The latch is adapted to be released through tripping actuation of a relatively large fork 38 which is disposed somewhat in advance of the check-head. In the preferred construction shown, the fork is constructed as a unitary part of the latch. But it will be obvious that the fork need not be integral with the latch, any other mechanism to secure the same result being within the purview of my invention. It will be noted that the arms of the large fork 38 are spaced relatively far apart so that there is no possibility of one of the check row buttons B tripping the large fork.

For tripping this large fork, a relatively large doffing button D is mounted on the check-wire at each end of the row. Referring to Figs. 4, 5, and 6, it will be noted that this button comprises two semi-circular plate members 41 and 42 which are pivotally connected together at 43, so that the two plates or sections can be swung apart to the open position shown in Fig. 5, or can be folded together to the closed position shown in Fig. 4. The inner meeting edges of the two sections are provided with companion notches 44 which are adapted to close together over the wire. To strengthen the pivotal connection between the two halves of the button, the section 42 is constructed with spaced side portions (see Fig. 6) between which is defined a guide space 45. The other button section 41 is formed with a segmental extension 46 which swings in the guide space 45, said extension 46 entering this guide space through a slot 47 which is cut in the edge of the section 42. It will be noted that when the two button sections are closed together, the spaced side portions of the section 42 overlap each side of the segmental extension 46, thus firmly holding the two sections together against twisting movement. The section 42 is preferably constructed by folding a circular disc along a substantially diametrical line to produce the spaced side portions. The slot 47 into which the segmental guide portion 46 extends, is preferably cut in the blank before the same is folded. The two button sections are adapted to be held closed together over the check-wire by a spring detent 48. One end of such detent is suitably secured to the button section 41 and the other end has a nose or latching portion which is adapted to snap into a slot 49 in the other button section 42. This latching detent can be readily released when it is desired to open the button for removing the same from the wire. It will be observed that the inner curved edge of the guide extension 46 terminates at one side of the notch 44 in the button 41, and the inner edge of the detent 48 lies at the opposite side of the notch. Thus these two edges form a tapering guide for guiding the wire into the notch 44, as the button sections are being closed together over the wire. Referring to Figs. 1 and 2, it will be seen that the doffing button D is always mounted directly on one of the usual check row buttons B. The notches 44 of the doffing button are placed to engage over the loops of the check row button, whereby the doffing button is positively held against sliding movement in either direction by the shoulders or projections b.

In the operation of the doffing mechanism, a doffing button D is mounted at each end of the check-wire C at points corresponding to the opposite ends of the row to be planted i. e. the distance between the two doffing buttons defines substantially the length of the row which will be planted. I have found that best results are obtained when the doffing buttons are spaced inwardly from the anchor stakes a distance corresponding to several check row buttons B. As illustrative of the above, I have found that it is preferable to space the doffing button at least four buttons (B) from the anchor stake, in the case of a two row planter, and seven to eight buttons from the anchor stake, in the case of a three row planter. This is to insure that the automatic doffing operation will occur before that portion of the check-wire between the stake anchor and the approaching implement is caused to extend at a relatively sharp angle, with respect to the remaining length of the wire extending across the field. As is well known to those familiar with check row planting operations, when the planting implement has been turned at the end of the field and is in position to plant the next succeeding set of rows, the operator draws the stake anchor at that end of the field, shifting it and the check-wire to a position directly back of the transverse center of the implement, where the stake is reset with the result that the anchor stakes are always located at points so situated at the ends of the field that when the planting implement is approaching one end of the field, along the previously formed marker line, the stake at that end of the field is not directly in front of the planter, or in direct alignment with the course of travel of the implement, but is situated off to one side thereof, i. e. laterally in a direction toward the previously planted portion of the field. At this time the check-wire is, of course, engaging in the check-head that is on the side of the implement that is toward the part of the field that has been planted. As the implement approaches the stake anchor that portion of the wire between said anchor and the check-head assumes a continuously increasing angle with respect to the direction of the wire extending rearwardly from the implement, which angle causes an increasing tension to be placed upon the wire. This tension acts lengthwise of the wire and also acts in a direction tending to pull the wire outwardly in a lateral direction from the check-head, such outward pull being resisted by the rollers 33 on the pivoted frame 29 of the check-head. The predetermined location of the doffer button D on the check-wire, as above described, results in the doffing operation occurring automatically before the increasing tension in the wire can tip the stake at the opposite end of the field, or pull the same out of the ground, or before this tension can deterimentally affect the accuracy of the check at the end of the field. At the time that the doffing button D strikes the doffing fork 38 the wire is, however, under sufficient tension to insure instant opening of the check-head. As illustrated in dotted lines in Fig. 3, when the latch 35 is tripped, the pivoted frame member 29 swings outwardly and downwardly, permitting the wire to slip outwardly off the ends of the spools 33. At the same time, the tension of the wire causes the check fork 19 to swing outwardly, whereby the wire is permitted to slip out of the fork. It will be noted from Fig. 1 that the doffing fork 38 extends outwardly substantially horizontally, and that the free end thereof is curved rearwardly, so that simultaneously with the tripping of the latch 35 the doffing button can free itself from the doffing fork. The downward swinging movement of the pivoted frame is limited by one of the spools striking a lug 51 projecting from one of the arms of the stationary frame. Similarly, the outward swinging movement of the fork 19 is limited, substantially to the dotted line position shown in Fig. 3, by the lower end of the fork striking the lugs 23. It is advantageous to limit the outward swinging movement of the pivoted frame and of the check fork in the manner indicated, so that after the planter has been turned and the check-wire has been replaced in the check fork the check-head can be closed by merely pulling on the wire. In this regard, it will be noted that the pivoted frame 29 has a lug 52 projecting therefrom at its rear end. When the check-wire is replaced in the check fork, after the planter has been turned and the stake anchor shifted to its new position, it bears against this lug and when a pull is exerted on the wire it acts through such lug to swing the pivoted frame upwardly to latched position.

In addition to serving as a gage element for determining the point of doffing of the wire, each doffing button also serves as a gage or indicating element for indicating the point where the next succeeding set of rows should be started. After the implement has been turned around at the end of the field it is driven back along the next set of rows sufficiently far to place the doffing button just in rear of the check-head that is then toward the planted side of the field. It will be evident that if the wire were engaged in the check-head with the doffing button located in front of the check-head, the latter would be opened immediately upon the forward movement of the implement. Thus the doffing button serves as an indicating element which determines where the next succeeding row shall be started, and hence insures uniformity of cross checking at the ends of the field.

It will, of course, be understood that in the above description and in the appended claims I have used the term "check row wire" merely in a representative sense, and that such includes any equivalent cable or the like having projections thereon for securing check row dropping of the seeds.

What I claim as my invention, and desire to secure by Letters Patent, is:

1. The combination with a planting implement comprising a check-head and a check-row wire cooperating therewith, of releasable holding means comprising part of said check-head for normally holding the check-row wire in operative position in the head, and cooperating members on said check-head and on said check-wire adapted by their engagement to release said holding means from said check-head for automatically doffing said wire.

2. In a planting mechanism of the class described, the combination of a check-head comprising a valve operating member adapted to be actuated by the check-row buttons on a check-wire, releasable holding means on said check-head for normally holding said check-row wire in operative position, and means adapted to be actuated by a relatively large projection on the check-wire to automatically release said holding means from the check-head for doffing the wire from said check-head.

3. In a planting mechanism of the class described, the combination of a check-head comprising stationary and movable frame members, and a valve operating member adapted to be actuated by the check-row buttons on a check-wire, and means adapted to be actuated by a relatively large doffing projection on the check-wire for automatically moving said movable frame member for doffing the wire at the end of the planting row.

4. In planting mechanism of the class described, the combination of a check-head adapted to be opened and closed and comprising a valve operating member adapted to be actuated by the check-row buttons on a check-wire, and latch means adapted to be tripped by a relatively large doffing button mounted on the check-wire adjacent to the end of the row, for permitting the check-head to open and the wire to be doffed automatically.

5. In planting mechanism of the class described, the combination of a check-head adapted to be opened and closed and comprising a valve operating member adapted to be actuated by the check-row buttons on a check-wire, latch means for holding said check-head closed, cooperating fork means for disengaging said latch means, and a relatively large doffing button mounted on the check-wire at the end of the row, said doffing button being adapted to engage said fork means and release said latch means for permitting said check-head to open.

6. In a planting implement, the combination with a check-head comprising a check fork and stationary and movable frame members having guide means for guiding a check-wire through said fork, of a latch for holding said frame members in operative association, a tripping fork for releasing said latch, and a doffing button on said check-wire operable to engage said latter fork for releasing said latch.

7. In a planting implement, the combination with a check-head comprising a stationary frame and a movable frame, a check fork adapted to be actuated by the buttons on a check-wire, and guide spools on said frames for guiding the wire through said check fork, of latch means for holding said frames in operative association, a tripping fork for releasing said latch means, said tripping fork permitting said check-row buttons to pass through said latter fork without actuating the same, and relatively large doffing buttons mounted on said wire for engaging said tripping fork and releasing said latch means, whereby said movable frame is permitted to swing outwardly to free the check-wire from said check-head.

8. A doffing button for the purpose described comprising two pivotally connected plates adapted to be closed together over the check-wire.

9. A doffing button comprising two pivotally connected members adapted to be closed together over the check-wire, and detent means for holding said members in wire-engaging relation.

10. A doffing button comprising two pivotally connected plates having companion edges adapted to be closed together over the check-wire, one of said edges having a wire receiving opening therein adapted to be closed by the companion edge of the other plate.

11. A doffing button comprising two pivotally connected plates adapted to be closed together over the wire, one of the two meeting edges of said plates having a wire receiving opening therein adapted to be closed by the meeting edge of the other plate, and detent means for holding said plates connected together over the wire.

12. A doffing button comprising two pivotally connected members adapted to be closed together over the wire, one of said members comprising spaced side portions, and the other of said members having a guide portion adapted to move between said spaced side portions when said members are closed together.

CHARLES H. WHITE.